United States Patent Office 3,361,679
Patented Jan. 2, 1968

3,361,679
AEROSOLIZED HALOGENATED OLEFIN POLYMER COMPOSITION
George F. Paulus, Port Huron, Mich., assignor to Acheson Industries, Inc., Port Huron, Mich., a corporation of Michigan
No Drawing. Filed Jan. 5, 1967, Ser. No. 607,387
14 Claims. (Cl. 252—305)

ABSTRACT OF THE DISCLOSURE

A substantially water-free aerosol composition for use in forming low friction surface coatings consisting essentially of a low molecular weight fluorocarbon polymer, at least one film-forming thermoplastic resin, solvent for the resin, and a propellant material for aerosolizing the composition; a method of forming coatings with the aerosol composition; and a dispersion composition for use in formulating the aerosol composition.

CROSS REFERENCES TO RELATED APPLICATIONS

This application is a continuation-in-part of copending application Ser. No. 182,668, filed Mar. 26, 1962.

BACKGROUND OF THE INVENTION

It has been known for some time that articles with a fluorocarbon polymer surface coating would have useful low friction properties. The earliest method of forming such coated articles was by fusing or sintering of the polymer itself to the substrate. This, of course, is limited in utility since the substrate must be one which can tolerate the high temperatures (450°–750° F.) necessary for melting and fusing the fluorocarbon polymer.

Welch in U.S. Patent No. 2,777,783 improves the application procedures by combining with the fluorocarbon resin various organic resins; however, he still requires fusion of the fluorocarbon resin to obtain the desired coatings, and does not use a low molecular weight fluorocarbon. In contrast, the composition of this invention form adherent coatings on curing of the resin binder at room temperatures, without fusion of the fluorocarbon polymer.

Lantos (U.S. Patent No. 2,951,047) and Janssens (U.S. Patent No. 3,154,506) present ways to avoid this high fusion temperature by utilizing other resinous binders; but the compositions of these inventions have water as an essential part of the coating composition, and as such, these compositions cannot be successfully applied to substrates from aerosol formulations or containers, and have relatively short stability or storage life as shown by the necessity to supply these compositions to the trade as two package systems which require mixing prior to application and have a relatively short pot life after mixing. In contrast to these previously known compositions, the substantially water-free compositions of this invention can be readily aerosolized and remain stable and useful for periods greater than one year.

Moreover, in regard to U.S. Patent No. 3,154,506, when the Janssens compositions were formulated using the Teflon 30 type polytetrafluoroethylene (PTFE) therein disclosed, the PTFE used was in a form of approximately 60% solids in water. When this dispersion of Janssens using Teflon 30 was prepared and attempted to be incorporated in an aerosol formulation, the water in the formulation was apparently the cause of instability which expressed itself in the form of agglomerations of the PTFE occurring in both the aerosol formulation and the deposited coatings after a relatively short time. A solution of this problem was attempted by using water-free PTFE, that is, using the PTFE in dry powder form, however, acceptable dispersions could not be formed in this matter and the agglomeration problem was still present. When preparing aerosol formulations in accordance with the present invention, the specific low molecular weight fluorocarbon used is purchased, for example as a 20% dispersion in a water-free carrier. When this low molecular weight fluorocarbon polymer is formulated into a dispersion as disclosed herein and then incorporated into an aerosol formulation, the unexpected discovery has been made that the dispersion and the subsequent formulation obtained are uniquely stable and compatible. By stable it is meant that the agglomeration problem is overcome because the fluorocarbon particles, resin and solvents are all compatible; and by compatible it is meant that the low molecular weight fluorocarbon polymer as well as the thermoplastic resin used and the solvent for the same operate together in such a manner that there is no adverse effect or interrelationship between the materials which causes the dispersion or formulation to become unstable, or result in agglomerations of the fluorocarbon particles forming in the aerosol formulation or in the coating eventually deposited using the aerosol formulation. The fact that one or two shakes of the aerosol container are normally required before applying the formulation of this invention does not mean that the comopsition is unstable. The reason for the mild shaking is that the low molecular weight fluorocarbon polymer particles do tend to undergo a soft settling from the dispersion in its container; however, even though there is a soft settling of these particles from the dispersion, the particles can be easily redispersed using only mild shaking. This redispersion is not possible when the Janssens' dispersion is incorporated into an aerosol formulation for the reason that the Janssens' fluorocarbon polymer particles and the dispersions formed therewith whether containing water or not are unstable and form agglomerations as referred to above. These agglomerations once formed will not redisperse, and hence effectively act to prevent the use of aerosol formulations or stable one package dispersions with the Janseens' teachings.

Accordingly, the primary object of this invention is to provide an improved aerosol composition containing finely divided fluorocarbon polymer particles and a thermoplastic binder resin with a solvent, which composition can be applied to a substrate by aerosol application to obtain an adherent, low friction coating.

Another object of this invention is to provide a method of forming on a variety of substrate surfaces, protective and dry film lubricating coatings which contain uniformly distributed fluorocarbon polymer particles in a thermoplastic resin matrix film.

Another important object of this invention is to provide a liquid dispersion containing fine particles of low molecular weight fluorocarbon polymer, a resinous binder and an organic solvent for said binder resin, which dispersion is capable of being aerosolized and packaged in a pressurized propellant gas atomizing spray container, and handled and stored for long periods prior to application.

Another object is to provide a pressurized container containing the aerosol composition.

Other objects, features and advantages of the present invention will become apparent from the subsequent description and the appended claims.

SUMMARY OF THE INVENTION

In accordance with this invention it has been found that compositions which possess the characteristics to enable the attainment of the above and related objects can be made by combining the fine particles of the low molecular weight fluorocarbon polymer with a thermoplastic resin and sufficiently substantially anhydrous solvent for that resin to form a dispersion capable of being aerosolized in conjunction with a propellant material. The resin must be one which will form an adherent film on the surface when the solvent is removed from the layer of the applied composition on the surface, preferably by evaporation at ordinary room temperature. The solvent must be capable of dissolving the selective thermoplastic resin and be incapable of dissolving the fluorocarbon polymer particles.

DESCRIPTION OF PREFERRED EMBODIMENTS

Low molecular weight fluorocarbon polymers which have been found to be suitable for the purposes of this invention are those fluorocarbon polymers having a molecular weight in the range of about 2,000 to about 7,000 and in the form of solid, fine particles having a size in the range of about ½ micron to about 10 microns, and an average particle size of about 5 microns or less. By the term fluorocarbon polymer as used hereinafter and in the appended claims is meant the polymers formed from ethylene, propylene, butylene and copolymers thereof which are completely fluorine saturated, e.g., tetrafluoroethylene polymers, or substituted with fluorine and chlorine, e.g., chlorotrifluoroethylene polymers and copolymers such as tetrafluoroethylene - hexafluoropropylene polymers, tetrafluoroethylene-octofluorobutylene polymers, etc. Such polymers are formed by the method now known to those skilled in the art from the fluoro, or fluorochloro substituted monomers by polymerization in a non-reactive solvent, e.g., trichlorotrifluoroethane, to the desired molecular weight and effecting termination of the polymerization by adding a non-polymerizable component capable of joining to the polymer to provide a terminating end group, such as methanol, isopropanol, butanol, carbon tetrachloride, etc. A preferred group of such polymers are those having an average molecular weight in the range of 4,000–6,000, with the best results, to date, having been achieved with tetrafluoroethylene polymers having an average molecular weight of about 6,000.

The term thermoplastic resin as used herein and in the appended claims is intended in its normally understood sense. More specifically it is intended to include all of the classes of specific resins, modified and unmodified and compatible admixtures thereof, which are different from the fluorocarbon polymer; moreover, it is intended to include those resins which are capable of being applied to substrates from aerosol containers and in the form of fluid systems and which will dry to form an adherent and continuous film. This broadly includes the thermoplastic resins or mixtures thereof from the group of the cellulosic resins, the vinyl resins, the chlorinated rubbers, the acrylics, the polyamides, and a hydrocarbon resin such as the polyterpene resins. Preferably the resin should be one selected from the group of the cellulosic resins, the vinyl resins, and the acrylic resins. Since the term vinyl resin includes acrylic resin within its scope the groups can be more concisely stated in regard to these two as just the vinyl resins. The discovery has been made that the thermoplastic resins disclosed above are especially suitable for forming stable, compatible dispersions for use in the aerosol compositions herein.

The cellulosic resins include all the cellulosic ester and ether resins which are soluble in substantially anhydrous organic solvents. Suitable cellulose esters include cellulose acetate, cellulose acetate butyrate, cellulose acetate propionate, cellulose triacetate, cellulose propionate and nitrocellulose and suitable cellulose ethers include ethyl cellulose, ethyl hydroxyethyl cellulose, carboxyethyl cellulose, hydroxypropylmethyl cellulose, and carboxymethyl hydroxyethyl cellulose. Mixtures of the cellulose esters or cellulose ethers can be used and, in certain cases, mixtures are more desirable than a single ester or ether, since certain mixtures produce degrees of adhesion and variations in flexibility that are not obtainable by the use of a single cellulosic resin. Of these esters, nitrocellulose is preferred, while the preferred cellulose ether is ethyl cellulose.

The vinyl resins include polyvinyl acetate, polyvinyl acetals, polyvinyl alcohols, polyvinyl butyral and vinyl copolymers. The most useful vinyl resins are the copolymers, which have good solubility in organic solvents and desirable film-forming properties, and of these the copolymers of polyvinyl chloride and polyvinyl acetate are the most useful. The acrylic resins useful in this invention are the organic solvent-soluble polymers and copolymers of acrylic acid, substituted acrylic acid, and methacrylic acid, including the salts and esters of these acids.

The hydrocarbon resins referred to are the petroleum resins produced by polymerization of unsaturates derived during the catalytic distillation of crude petroleum and are intended to encompass the polyterpene resins which find greatest use in conjunction with the chlorinated rubbers.

The compositions of this invention may also contain other ingredients such as conventional fillers, solid lubricants other than fluorocarbon resins, coloring agents, odorents, and the like so long as the quantity thereof does not prevent the thermoplastic resins upon drying from forming a strong bond both to the surface of the substrate and the fluorocarbon polymer particles distributed therein, and does not destroy the lubricant character of the coating.

As above generally indicated, the dispersion medium for use in the compositions of this invention functions to dissolve the resin and to form a liquid dispersion of the fluorocarbon polymer particles of the desired consistency to enable easy application to the surface to be coated by aerosol application using a spraying or atomizing technique. The dispersion medium is preferably one which is relatively volatile at room temperatures since this characteristic assures rapid drying and adhesion to the surface coating. The dispersion medium must be incapable of dissolving the fluorocarbon polymer, and it must be substantially water free. Inasmuch as the fluorocarbon polymers of this invention are insoluble in most organic solvents any of the common aliphatic and aromatic hydrocarbons, ethers, esters, ketones, alcohols, chlorocarbons, etc., function satisfactorily as the solvent portion of the dispersion medium if they are substantially water free. The best solvent for any specific formulation may be selected on the basis of its ability to dissolve the selected thermoplastic resin and compatibility with the other components of the dispersing medium, and the propellant material. While it is possible to use a single organic solvent as the dispersing medium, in most cases it is preferable to use a blend of organic solvents to obtain the optimum physical characteristics such as application ease, controlled volatility, etc. A solvent blend is also desirable in that it usually increases the solubility of the thermoplastic resin without increasing the solubility of the fluorocarbon polymer. The solvent used must also be compatible with the propellant material used in the aerosol compositions for application from the aerosol containers.

Since the compositions of this invention are preferably packaged into and dispensed from internally pressurized spray containers (commonly called "aerosols," "aerosol bombs," or "aerosol containers") it is important that the organic solvents for the binder resins be compatible with the propellant. The specific propellant used in producing the aerosol composition, adapted for application from an aerosol container, is not critical to the performance of this invention, provided the propellant and organic solvent are compatible. Those propellants satisfactory for use in the invention are the fluorinated hydrocarbons, such as those designated by the trade name Freon; non-liquefied gases, such as nitrogen; halogenated compounds such as methylene chloride; and hydrocarbons such as propane, isobutane and the like.

The most useful propellant materials are those from the group of the fluoro-chloro haloalkane derivatives of methane and ethane; that is for example, dichlorodifluoromethane (Freon 12), trichloromonofluoromethane (Freon 11), and dichlorotetrafluoroethane.

Solvents which are suitable for use with the cellulose ethers include the alcohols such as ethanol, propanol, butanol, etc.; esters, such as ethyl acetate and butyl acetate, hydrocarbons, such as benzene, toluene, xylene and heptane and ketones, such as acetone. The glycols may also be used, such as ethylene glycol, hexylene glycol, ethylene glycol monoethyl ether, diethylene glycol, the ethers of diethylene glycol, etc. It is also suitable to employ halogenated hydrocarbons, such as ethylene dichloride, methylene chloride, carbon tetrachloride, etc.

The specific cellulosic ester resins which are above indicated to be suitable require separate and distinct organic solvents for the best film-forming characteristics. For cellulose acetate suitable solvents include acetone, diacetone, cyclohexanone, methyl acetate, ethyl lactate, etc. For cellulose acetate butyrate, typically suitable solvents include methylethyl ketone, methyl isobutyl ketone, acetone, etc.

For cellulose acetate propionate, typically suitable solvents include acetone, dioxane, methylene chloride, cyclohexanone, methyl acetate, etc. For cellulose triacetate, typically suitable solvents include dioxane, methylene chloride, nitropropane, chloroform and mixtures of ethylene chloride and methyl alcohol, etc. For cellulose propionate typically suitable solvents include butyl acetate, ethyl acetate, tetrahydrofurane, etc. For nitrocellulose, typically suitable solvents include methyl isobutyl ketone, butyl acetate, ethyl acetate, amyl acetate, etc. It is also desirable to employ in the compositions diluent to reduce the viscosity of the composition to the desired level and diluents which are suitable for this purpose include, for example, toluene, xylene, heptane, mineral spirits, ethyl alcohol, isopropyl alcohol, and butyl alcohol.

Solvents generally suitable for use with the vinyl resins include ketones, aromatic hydrocarbons, esters, and nitrohydrocarbons. Commercially available specific solvents which fall in these general categories and which may be used satisfactorily in the compositions of this invention include toluene, ethylene glycol monoethyl ether, methyl isobutyl ketone, and cyclohexanone, methyl alcohol, ethyl acetate and tetrahydrofurane.

Solvents generally useful with the acrylic resins include the chlorinated hydrocarbons, aromatic hydrocarbons, esters, and ketones, and specific solvents in these categories which have been found to be satisfactory include toluene, methyl isobutyl ketone, acetone, and ethylene glycol monoethyl ether.

The compositions of this invention as already mentioned are preferably applied to the substrate to be coated by atomizing or spraying from pressurized aerosol containers. The coatings of this invention are applied in relatively thin layers and where a relatively thick total coating is desired the coating is preferably built up by applying thin, multiple layers and allowing them to air-dry between applications. For most applications a coating having a thickness in the range of about 0.1 to about 1.5 mils provides the most satisfactory overall characteristics. A preferred coating thickness is one within the range of about 0.3 to about 0.8 mil.

Materials which can be satisfactorily coated include metals, glass, wood, leather, rubber, plastics, and the like.

The adhesion of the coating is enhanced, in general, by preliminarily roughening the surface such as by mechanical abrasion or by grit blasting, and where the substrate is metal, it may be desirable to use additional surface conditioning treatments to form thereon a coating of a metallic phosphate, oxalate, oxide or sulfide, or a mixture thereof, acid etching, chromate coating, or the like.

The aerosol container itself should preferably be a metal container with a capacity of about 2 to 20 ounces. The preferred control valves are those known in the aerosol industry as "paint valves."

The compositions of this invention may vary somewhat in concentration, but must be of such consistency as to be applicable by spray or pressure atomization application from an aerosol package to the surface to be coated. Suitable concentration range, including propellant material, is between about ½% and about 15% by weight solids, and preferably it is between about 1% and about 8%. Before addition of propellant, and packaging in the container, the concentration may be from about 1% to 30% total solids, and preferably it may be about 2% to about 16%. Coatings may also be formed from this material by conventional spraying techniques.

Relative quantities of resin solids and fluorocarbon polymer solids may vary over a relatively wide range depending upon the specific requirements of the particular application for the coating and vary from about 5% to about 60% of fluorocarbon polymer solids, by weight, of the total solids and from about 40% to about 95% of thermoplastic resin solids, by weight, of the total solids. Variation of the fluorocarbon polymer solids and the thermoplastic resin solids within the above given ranges produce variations in the ultimate coefficient of friction, adhesion, impact resistance, flexibility and wear life of the coating which is formed, and it will be understood that the optimum relative proportion of each can be easily established by a few simple tests under the specific conditions of use when the final application is known.

To date, the best results have been obtained from the use of fluorocarbon polymer solids in the range from about 10% to about 45% and thermoplastic resin solids in the range of about 55% to about 90%, by weight, of the total solids in the dispersions. Fillers and other additives are preferably restricted to not more than about 10%, by weight, of the total solids.

In the following illustrative examples, "parts" means "parts by weight."

*Example I*

A dispersion was prepared by first forming a dispersing medium by blending together 125.0 parts of n-propyl acetate, 6.2 parts of n-butyl alcohol, 17.2 parts of toluene, and 2.1 parts of isopropyl alcohol. To this solvent blend, 31.5 parts of ½ second nitrocellulose (the nitrocellulose used was a 70% content of RS ½ second nitrocellulose, the ½ second viscosity determined by ASTM method D301–50), and 18.0 parts of low molecular weight polytetrafluoroethylene polymer (having a molecular weight of 2,000 particle size of approximately 5 microns, density of 2.09 gm./ml., softening point of 424° F. and crystalline melting point of 534° F.), were added and blended to form a uniform concentrated dispersion.

This concentrate was then diluted with a diluent blend of organic solvent, which consisted of 1 part isopropyl alcohol, 3 parts n-butyl alcohol, 8 parts toluene, and 23 parts n-propyl acetate, 100 parts of this diluent blend being added to 100 parts of concentrated dispersion.

A portion of this diluted dispersion was then blended with an equal weight amount of dichloro-difluoromethane propellant material at a low temperature below about −20° F. and placed in a metallic pressure atomization container of conventional construction. At room temperature conditions, the materials within the pressurized spray container are under a pressure of approximately 5 atmospheres and after mild shaking the dispersion was found to spray uniformly from the container. This container was used to apply a coating to a steel 3″ x 6″ panel. After drying for four hours at room temperature, the applied film was dry, adherent and had a low coefficient of friction.

*Example II*

A portion of the diluted dispersion of Example I was placed in a metallic pressure atomization container and pressurized with nitrogen gas to an internal pressure of 4 atmospheres. This container was then used to spray a thin coating on a steel 3″ x 6″ panel. After drying for 4 hours the coating was examined and found to be smooth, adherent, and to have a low coefficient of friction.

Example III

A dispersion in accordance with the invention was prepared from the following materials:

| | Parts |
|---|---|
| ½ second RS nitrocellulose (70% content) | 15.75 |
| Normal butyl alcohol | 3.30 |
| Propyl acetate | 25.62 |
| Isopropyl alcohol | 1.15 |
| Toluene | 9.18 |
| Trifluorotrichloroethane | 36.00 |
| Low molecular weight polytetrafluoroethylene polymer (molecular weight approximately 3,000; particle size of approximately 5 microns; density of 2.16 gms./ml.; softening point of 510° F.; and crystalline melting point of about 570° F.) | 9.00 |
| Total | 100.00 |

30 grams of this dispersion was then inserted into a 6-ounce aerosol container preloaded with a proprietary blend of fluorinated hydrocarbon propellant and lacquer solvent known under the tradename of "Lacquer Type Omnipak."

During the first day after this composition was put up in the aerosol container, coatings on degreased cold rolled steel panels, 3″ x 6″, were prepared by the following procedure.

With the aerosol container, 6 to 8 inches from the surface of the panel, the surface was atomization spray coated. After 5 to 10 seconds during which the solvent flashed from the surface, the panel was recoated, and this procedure repeated a total of four times. During the 4th, 8th, 15th and 22nd days after the aerosol container had been filled as above described, panel surfaces were coated with the composition of this example using the same conditions above specified. An inspection of the surface coatings formed on all of these panels was made and showed that the coatings were approximately similar to the eye in appearance and also smooth and resistant to dislodgement by passing the fingernail over the surface under slight pressure.

Example IV

A dispersion was prepared using the procedure of Example I from the following materials:

| | Parts |
|---|---|
| ½ second nitrocellulos (same as in Example I) | 29.5 |
| Low molecular weight tetrafluoroethylene polymer (number average molecular weight of 6,000 particle size of approximately 5 microns, softening point greater than 525° F., and crystalline melting point above 570° F.) | 18.8 |
| n-Butyl alcohol | 12.1 |
| n-Propyl acetate | 214.4 |
| Isopropyl alcohol | 4.2 |
| Toluene | 33.7 |

This dispersion was loaded into aerosol containers and pressurized with equal weight amount of propellant, dichlorodifluoromethane. Coatings were applied to steel panels and evaluated as in Example I. The coating obtained was smooth and adherent, and had a low coefficient of friction.

Example V

A dispersion was prepared, using the procedure of Example I, from the following materials:

| | Parts |
|---|---|
| Ethyl cellulose (having a 47.5%–49% ethoxyl content and a viscosity of 18–24 cps. as measured on a 5% solution in 80:20 toluene:ethanol solution) | 19.5 |
| Xylene | 228.0 |
| Methyl isobutyl ketone | 42.0 |
| Low molecular weight tetrafluoroethylene polymer (as used in Example I) | 10.5 |

A portion of this dispersion was put into an aerosol container with an equal amount of dichlorodifluoromethane. The composition was then applied to steel panels as in Example I, except that 12 passes were required to obtain a coating thickness of 0.3 mil. The film produced had a low coefficient of friction, and was adherent to the substrate as indicated by successfully passing the impact and bend test.

Example VI

A dispersion was prepared in a manner similar to Example I from the following ingredients:

| | Parts |
|---|---|
| "Vinylite" VMCH [1] | 39 |
| Toluene | 78 |
| Cyclohexanone | 100 |
| Methyl isobutyl ketone | 162 |
| Methyl ethyl ketone | 100 |
| Low molecular weight tetrafluoroethylene polymer (as used in Example I) | 21 |

[1] "Vinylite" VMCH is vinyl copolymer which consists of 13% polyvinyl acetate, 86% polyvinyl chloride and 1% interpolymerized maleic anhydride.

A portion of this dispersion was loaded into aerosol containers with an equal volume of dichlorodifluoromethane propellant.

This composition was applied to panels as in Example I except that 8 passes were used to obtain a final coating thickness of 0.3 mil. This coating when tested had a low coefficient of friction value, successfully passed the impact and bend tests, and was smooth and adherent.

Example VII

A dispersion was prepared using the procedure of Example I and the following materials:

| | Parts |
|---|---|
| "Butvar" B–76 [1] | 19.5 |
| n-Butyl alcohol | 19.1 |
| n-Propyl acetate | 148.9 |
| Isopropyl alcohol | 6.6 |
| Toluene | 53.4 |
| Trichlorotrifluoroethane | 42.0 |
| Low molecular weight tetrafluoroethylene polymer (as in Example I) | 10.5 |

[1] "Butvar" B–76 is polyvinyl butyral with a weight average molecular weight of 50,000 and a butyral content of 88%.

This dispersion was reduced 1:1 with the diluent blend of Example I, packaged in an aerosol container using equal volume of propellant, dichlorodifluoromethane, and applied to metal panels in a manner similar to Example I except that 16 passes were required to obtain a finished film thickness of 0.3 mil. This coating had a low coefficient of friction and was smooth and adherent.

Example VIII

A dispersion was prepared in a manner similar to Example I from the following materials:

| | Parts |
|---|---|
| "Acryloid" B–72 [1] | 33 |
| Toluene | 132 |
| Methyl isobutyl ketone | 108 |
| Low molecular weight tetrafluoroethylene polymer (as used in Example I) | 27 |
| Cellosolve acetate | 100 |
| Methyl ethyl ketone | 100 |

[1] "Acryloid" B–72 is an acrylic acid ester polymer.

This dispersion was packaged into a conventional aerosol container with an equal amount of dichlorodifluoromethane and then the composition was applied to metal panels as in Example I, except that 6 passes were required to obtain a finished coating thickness of 0.6 mil. The coefficient of friction was low and the coating was smooth and adherent.

*Example IX*

A dispersion was prepared using the procedure of Example I with the following materials:

| | Parts |
|---|---|
| ½ second cellulose acetate butyrate [1] | 39 |
| Toluene | 125 |
| Denatured ethyl alcohol | 31 |
| Methyl ethyl ketone | 84 |
| Low molecular weight tetrafluoroethylene polymer (as used in Example I) | 21 |

[1] One-half second cellulose acetate butyrate designates a product with a butyral content of 37%, an acetyl content of 13% and a hydroxyl content of 2%.

This 20% solids dispersion was reduced to 10% solids with toluene/ethyl alcohol blend of 4:1 ratio and placed in a conventional aerosol container with an equal volume of a blend of dichlorodifluoromethane and trichloromonofluoromethane. This dispersion was then applied to steel panels as in Example I, except that 8 passes (layers) were used to produce a final coating thickness of 0.4 mil. The film produced had a low coefficient of friction and was adherent and smooth.

By the term aerosol composition as used herein it is meant a composition used in a pressurized container, aerosol bomb, aerosol container, or the like, and which composition can be sprayed or aerosolized from the container to form a coating on a substrate. By the term aerosolizing it is meant spraying the aerosol composition from its container. By the terminology substantially water free or just water free as used herein, it is meant that only a very minor amount of water at most is allowable and preferably none is present. In other words, manufacturing tolerances are such that slight amounts of water are sometimes present in the purchased materials for use in this invention, however, in no event should a water content be allowed such that the compatibility and stability of the compositions herein become detrimentally affected.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

What is claimed is:
1. A pressurized container containing substantially water free aerosol composition for use in forming low friction surface coatings consisting essentially of:
   a part (A) including
      a fluorocarbon polymer selected from the group consisting of homopolymers of fluorinated and fluoro-chlorinated olefins and copolymers of two or more of said olefins having a molecular weight in the range of about 2000 to about 7000, and being in the form of fine particles having a size within the range of about ½ to about 10 microns, and
      at least one film-forming thermoplastic resin different from said polymer dissolved in a solvent for said resin, and selected from the group consisting of the cellulosic resins, the vinyl resins, the chlorinated rubbers, the polyamide resins, and the polyterpene resins,
      said part (A) containing total solids in the range of about 1% to about 30% by weight
         said fluorocarbon polymer constituting between about 5% and about 60% by weight of the total solids, and said thermoplastic resin constituting between about 40% and about 95%, by weight of the total solids, and
   a part (B) constituting a propellant material for aerosolizing the composition,
      said part (A) and part (B) together containing total solids of said fluorocarbon polymer and said thermoplastic resin in the range of about ½ to about 15% by weight.

2. The composition of claim 1 wherein said fluorocarbon polymer is a tetrafluoroethylene polymer.

3. The composition of claim 1 wherein said thermoplastic resin is selected from the group consisting of cellulosic resins and vinyl resins, and said fluorocarbon polymer has a molecular weight in the range of about 4000 to about 6000.

4. The composition of claim 1 wherein said fluorocarbon polymer constitutes about 10% to about 45%, by weight of the total solids, and said thermoplastic resin constitutes about 55% to about 90%, by weight of the total solids.

5. The composition of claim 1 wherein said part (A) and part (B) are present in approximately equal amounts by weight.

6. The composition of claim 1 wherein said part (A) contains total solids of about 2% to about 16%, and said part (A) and part (B) together contain total solids of about 1% to about 8%.

7. The composition of claim 1 wherein said fluorocarbon polymer is a tetrafluoroethylene polymer, and wherein said thermoplastic resin is selected from the group consisting of cellulosic resins and vinyl resins, and said fluorocarbon polymer has a molecular weight in the range of about 4000 to about 6000.

8. The composition of claim 7 wherein said fluorocarbon polymer constitutes about 10% to about 45%, by weight of the total solids, and said thermoplastic resin constitutes about 55% to about 90%, by weight of the total solids.

9. A method of forming an adherent, low friction coating on a substrate comprising the steps of
   (1) spraying on the substrate a substantially water free aerosol composition consisting essentially of:
      a part (A) including
         a fluorocarbon polymer selected from the group consisting of homopolymers of fluorinated and fluoro-chlorinated olefins and copolymers of two or more of said olefins having a molecular weight in the range of about 2000 to about 7000, and being in the form of fine particles having a size within the range of about ½ to about 10 microns, and
         at least one film-forming thermoplastic resin different from said polymer dissolved in a solvent for said resin, and selected from the group consisting of the cellulosic resins, the vinyl resins, the chlorinated rubbers, the polyamide resins, and the polyterpene resins,
         said part (A) containing total solids in the range of about 1% to about 30% by weight
            said fluorocarbon polymer constituting between about 5% and about 60%, by weight of the total solids, and said thermoplastic resin constituting between about 40% and about 95%, by weight of the total solids, and
      a part (B) constituting a propellant material for aerosolizing the composition,
         said part (A) and part (B) together containing total solids of said fluorocarbon polymer and said thermoplastic resin in the range of about ½% to about 15% by weight, and
   (2) drying said composition at ambient temperatures until an adherent coating is formed.

10. The method of claim 9 wherein said fluorocarbon polymer is a tetrafluoroethylene polymer.

11. The method of claim 9 wherein said thermoplastic resin is selected from the group consisting of cellulosic resins and vinyl resins, and said fluorocarbon polymer has a molecular weight in the range of about 4000 to about 6000.

12. The method of claim 9 wherein said fluorocarbon polymer constitutes about 10% to about 45% be weight of the total solids, and said thermoplastic resin constitutes about 55% to about 90%, by weight of the total solids.

13. The method of claim 9 wherein said fluorocarbon polymer is a tetrafluoroethylene polymer, and wherein said thermoplastic resin is selected from the group consisting of cellulosic resins and vinyl resins, and said fluorocarbon polymer has a molecular weight in the range of about 4000 to about 6000.

14. The method of claim 13 wherein said fluorocarbon polymer constitutes about 10% to about 45%, by weight of the total solids, and said thermoplastic resin constitutes about 55% to about 90%, by weight of the total solids.

References Cited

UNITED STATES PATENTS

| | | | |
|---|---|---|---|
| 2,524,590 | 10/1950 | Boe | 252—305 |
| 2,766,157 | 10/1956 | Peterson | 252—305 |
| 2,951,047 | 8/1960 | Lantos | 260—897 |
| 3,154,506 | 10/1964 | Janssens | 260—29.9 |

WILLIAM H. SHORT, *Primary Examiner.*

SAMUEL H. BLECH, *Examiner.*

J. NORRIS, *Assistant Examiner.*